United States Patent
Takeuchi et al.

(10) Patent No.: US 8,337,710 B2
(45) Date of Patent: Dec. 25, 2012

(54) OZONE OXIDATION ACCELERATOR, OZONE OXIDATION ACCELERATOR COMPOSITION, AND OZONE TREATMENT METHOD

(75) Inventors: Yoshikuni Takeuchi, Tokyo (JP); Taku Ogura, Saitama (JP); Masaru Tamura, Tokyo (JP)

(73) Assignee: LION Corporation, Tokyo (JP)

( * ) Notice: Subject to any disclaimer, the term of this patent is extended or adjusted under 35 U.S.C. 154(b) by 0 days.

(21) Appl. No.: 13/113,151

(22) Filed: May 23, 2011

(65) Prior Publication Data

US 2011/0223073 A1    Sep. 15, 2011

Related U.S. Application Data

(62) Division of application No. 12/083,130, filed as application No. PCT/JP2006/319956 on Oct. 5, 2006.

(30) Foreign Application Priority Data

Oct. 5, 2005 (JP) ................... 2005-292408

(51) Int. Cl.
*C02F 1/78* (2006.01)
(52) U.S. Cl. ...................... 210/760; 210/763
(58) Field of Classification Search .................. 210/760, 210/763, 900; 261/DIG. 42
See application file for complete search history.

(56) References Cited

U.S. PATENT DOCUMENTS

| | | | |
|---|---|---|---|
| 2,466,663 A * | 4/1949 | Schweitzer et al. | 514/494 |
| 2,911,437 A | 11/1959 | Keith | |
| 5,012,012 A | 4/1991 | Nakamura et al. | |
| 5,777,157 A * | 7/1998 | Khramov | 560/263 |
| 5,944,907 A | 8/1999 | Ohmi | |
| 5,945,391 A | 8/1999 | Yant et al. | |
| 6,504,061 B1 | 1/2003 | Okamoto et al. | |
| 2004/0033269 A1 | 2/2004 | Hei et al. | |
| 2005/0051922 A1 | 3/2005 | Nangia et al. | |
| 2005/0153859 A1 | 7/2005 | Gohl et al. | |
| 2005/0163896 A1* | 7/2005 | Man et al. | 210/764 |

FOREIGN PATENT DOCUMENTS

| | | |
|---|---|---|
| JP | 1-164437 | 6/1989 |
| JP | 3-164155 | 7/1991 |
| JP | 6-313194 | 11/1994 |
| JP | 8-306655 | 11/1996 |
| JP | 11-226579 | 8/1999 |
| JP | 2000-61304 | 2/2000 |
| JP | 2000-109887 | 4/2000 |
| JP | 2001-164298 | 6/2001 |

(Continued)

OTHER PUBLICATIONS

Dow product information for n-propyl acetate (Oct. 2002).

(Continued)

*Primary Examiner* — Lucas Stelling
(74) *Attorney, Agent, or Firm* — Merchant & Gould P.C.

(57) ABSTRACT

The present invention relates to an ozone oxidation accelerator containing a compound of which a 0.5% by mass aqueous solution at 25° C. has a dynamic surface tension at 100 msec of 70 mN/m or less and a dynamic surface tension at 30 sec of 55 to 67 mN/m, and an ozone oxidation accelerator composition containing the ozone oxidation accelerator. The present invention also relates to an ozone treatment method including a step of supplying ozone into water to be treated that contains a substance to be treated, in the presence of the ozone oxidation accelerator composition.

3 Claims, 1 Drawing Sheet

FOREIGN PATENT DOCUMENTS

| | | |
|---|---|---|
| JP | 2006-32432 | 2/2006 |
| JP | 2006-278644 | 10/2006 |

OTHER PUBLICATIONS

Search Report for International Application No. PCT/JP2006/319956 mailed Nov. 7, 2006.

Search Report for European Application No. EP 06 81 1294 mailed Nov. 3, 2011.

European Search Report for Application No. EP 12 17 0560 mailed Jul. 13, 2012.

European Office Action for corresponding European Patent Application No. 06811294.5 (mailed Jul. 23, 2012).

European Search Report for Application No. EP 12 17 0560 mailed Jul. 24, 2012.

* cited by examiner

OZONE OXIDATION ACCELERATOR, OZONE OXIDATION ACCELERATOR COMPOSITION, AND OZONE TREATMENT METHOD

This application is a divisional of U.S. patent application Ser. No. 12/083,130, filed 3 Apr. 2008, which is a National Stage Application of International Application No. PCT/JP2006/319956, filed 5 Oct. 2006, which claims the benefit of Japanese Patent Application No. 2005-292408, filed 5 Oct. 2005 in Japan, the disclosures of all of which are hereby incorporated by reference in their entireties. To the extent appropriate, a claim of priority is made to each of the above disclosed applications. The International Application was published in Japanese on 12 Apr. 2007 as WO 2007/040260.

TECHNICAL FIELD

The present invention relates to an ozone oxidation accelerator that accelerates ozone oxidation and exhibits excellent effects of bleaching, sterilization, deodorizing, decomposition, synthesis, or the like, an ozone oxidation accelerator composition, and an ozone treatment method.

Priority is claimed on Japanese Patent Application No. 2005-292408, filed on Oct. 5, 2005, the content of which is incorporated herein by reference.

BACKGROUND ART

Ozone has an extremely high standard oxidation-reduction potential at 25° C. of 2.07V, and its oxidation potential is the next strongest after fluorine. Therefore, an ozone treatment is conventionally performed by taking advantage of this oxidation potential in various fields of semiconductor-cleaning, food-cleaning (sterilization), water-purification, and the like.

In addition, since ozone produces only oxygen by decomposition thereof, and therefore ozone is environmentally friendly, use of ozone has tended to increase in recent years.

A method for improving effects of such an ozone treatment usually involves increasing the amount of ozone used. However, an increase of the amount of ozone used directly leads to an increase in treatment cost. In addition, the amount of non-utilized de-absorbed ozone, that is, ozone released in air without being absorbed in water when performing the treatment while supplying ozone into water, will be increased. An increase of de-absorbed ozone not only leads to an increase in cost required for the treatment but also heightens concern about work safety. In Japan and many other countries, in regard to the ozone concentration, a value of 0.1 ppm (=0.2 mg/m$^3$) is employed as a work environment standard considering work safety. Thus, there is a limit to increasing the amount of ozone used.

For solving such problems, Patent Document 1 discloses a sterilizing method including the use of ozone together with hydrogen peroxide as a method for obtaining a high treatment effect while reducing the amount of ozone used. Patent Document 2 discloses a sterilizing method including immersing food alternately into an ozone solution and an organic acid solution and/or an alcohol solution.

However, these methods require another treatment step to be performed in addition to the step of treating with ozone, and thus the process becomes complicated.

Further, as the method for improving efficiency of the ozone treatment, a method of using ozone with an organic substance has been proposed.

For example, Patent Document 3 discloses a germicidal detergent composition containing ozone and a surfactant, the germicidal detergent composition enhancing germicidal effects when the substance to be treated is immersed therein. The germicidal detergent composition is intended to supplement washing effects on oily components with a surfactant, and also to employ the residual effect of ozone.

Patent Document 1: Japanese Unexamined Patent Application, First Publication No. H11-226579
Patent Document 2: Japanese Unexamined Patent Application, First Publication No. H3-164155
Patent Document 3: Japanese Unexamined Patent Application, First Publication No. H6-313194

DISCLOSURE OF THE INVENTION

Problems to be Solved by the Invention

As the method of ozone treatment, a method of supplying (aerating) ozone (gas) into water to be treated containing a substance to be treated (ozone aeration treatment), or a method of immersing a substance to be treated in an ozone solution in which ozone is dissolved therein (ozone water immersion treatment) as disclosed in Patent Document 2 or 3, may be usually adopted. Among them, the ozone aeration treatment has advantages in that a small amount of ozone is used, a small amount of water is used, the treatment can be performed even if the amount of an organic substance to be treated is large, and the like, as compared to the ozone water immersion treatment.

However, in the case where the ozone aeration treatment is performed, it is difficult to improve the efficiency of ozone treatment with the method disclosed in Patent Document 3. For example, if a surfactant is present in water to be treated, bubbling on the water surface occurs upon aeration, and accordingly overflow or the like may occur, and thus the treatment efficiency may be lowered or it may become impossible to carry out the treatment at all. In addition, ozone may act on the surfactant in water to be treated and accordingly the amount of ozone that acts on a substance to be treated decreases, thereby reducing the efficacy of ozone treatment. In particular, in the case where an ozone aeration treatment is performed at a low concentration as mentioned above in consideration of work safety, the ozone treatment efficiency is extremely poor.

The present invention is made under these circumstances, and an object thereof is to provide an ozone oxidation accelerator, an ozone oxidation accelerator composition, and an ozone treatment method, by which bubbling on the water surface can be controlled and ozone oxidation can be simply accelerated in an ozone aeration treatment particularly at a low concentration.

Means for Solving the Problems

The present inventors have carried out extensive studies to achieve the above-mentioned object, and as a result, the present inventors have found that the above-mentioned problem can be solved by using a compound having specific properties. Thus, the present inventors have completed the invention.

That is, a first aspect of the invention is an ozone oxidation accelerator containing a compound of which a 0.5% by mass aqueous solution at 25° C. has a dynamic surface tension at 100 msec of 70 mN/m or less and a dynamic surface tension at 30 sec of 55 to 67 mN/m.

A second aspect of the invention is an ozone oxidation accelerator composition containing the ozone oxidation accelerator of the first aspect.

A third aspect of the invention is an ozone treatment method including a step of supplying ozone into water to be treated that contains a substance to be treated, in the presence of the ozone oxidation accelerator composition of the second aspect.

Effects of the Invention

The ozone oxidation accelerator, the ozone oxidation accelerator composition, and the ozone treatment method according to the present invention enable bubbling on the water surface to be controlled in an ozone aeration treatment, particularly in an ozone aeration treatment at a low concentration, and also enable an ozone oxidation treatment to be easily accelerated. Therefore, a reduction in the amount of ozone used in an ozone aeration treatment and an increase in efficiency of the ozone aeration treatment can be achieved according to the present invention.

BEST MODE FOR CARRYING OUT THE INVENTION

Ozone Oxidation Accelerator

Figure 1:
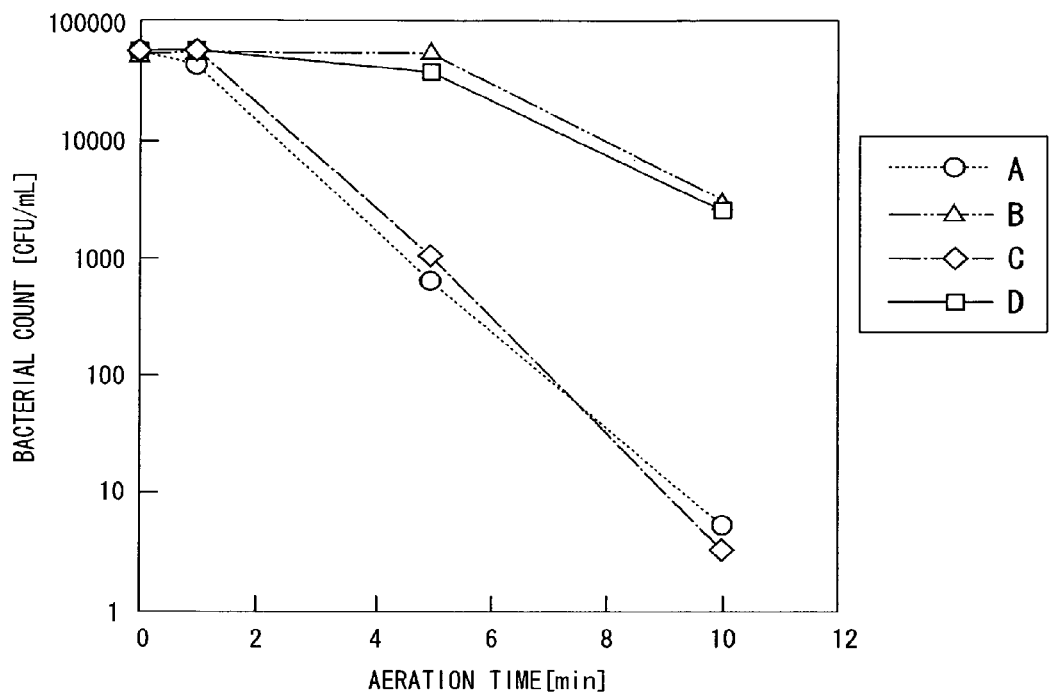
FIG. 1 is a graph showing a change in sterilization effect over time in cases where ozone aeration is performed by changing an ozone concentration without adding any additives and cases where glycerin or triacetin is added in low-concentration ozone aeration in Test Example 2.

The ozone oxidation accelerator according to the present invention is composed of a compound of which a 0.5% by mass aqueous solution at 25° C. has a dynamic surface tension at 100 msec (hereinafter, also may be abbreviated as 'dynamic surface tension at 100 msec') of 70 mN/m or less and a dynamic surface tension at 30 sec (hereinafter, also may be abbreviated as 'dynamic surface tension at 30 sec') of 55 to 67 mN/m.

In the present specification and claims, the term 'dynamic surface tension' refers to a surface tension when a new interface is formed or an interface is in an unstably flowing or stirred state.

A process of forming bubbles by supplying a gas into water through a straw is given as an example. When a gas is supplied through a straw put diagonally in water, a hemispheric interface (interface between water and gas) is formed from a tip of the straw. At this time, a force trying to restore the interface (surface tension) and a gas buoyant force are acting on the interface. The buoyant force becomes greater in accordance with an increase in the amount of gas in the interface. When the buoyant force becomes greater than the surface tension, the hemispheric interface separates from a tip of the straw and forms a bubble, which rises up on the water surface. Bubbles are repeatedly produced and collect on the water surface to produce foam.

At this time, the interface is in an unstable state. After forming a bubble (after stopping the supply of a gas), the interface becomes stable with time. The surface tension gradually decreases in accordance with this stabilization, and becomes uniform (equilibrium value). As such, the surface tension of a bubble's interface after formation and before reaching an equilibrium value (until the interface reaches in a stable state) refers to the dynamic surface tension. The dynamic surface tension changes with respect to each measurement time.

For the formation of bubbles, the smaller the amount of gas supplied at the time when the buoyant force becomes greater than the surface tension, the smaller the size of the bubbles. Also, the smaller the equilibrium value, the higher the stability of bubbles or foam, and thus they are hardly likely to break. Alternatively, the greater the equilibrium value, the lower the stability of bubbles or foam, and thus they are more likely to break.

Characteristic of bubbles generated in water to be treated by ozone aeration is controlled by components to be blended in water to be treated, according to the present invention, and thereby excellent effects are achieved, as shown below.

The dynamic surface tension at 100 msec is 70 mN/m or less, preferably 68 mN/m or less, and more preferably 65 mN/m. Although the lower limit is not particularly limited, the dynamic surface tension at 100 msec is preferably 55 mN/m or greater, and more preferably 60 mN/m or greater.

Herein, the dynamic surface tension at 100 msec is a dynamic surface tension after 100 msec from 0 msec provided that the point where the gas supply is started is 0, Specifically, with reference to the above example of supplying gas through a straw, the dynamic surface tension at 100 msec is a dynamic surface tension 100 msec after the start of gas being supplied into a straw. When the dynamic surface tension at 100 msec is 70 mN/m or less, a buoyant force becomes greater than the surface tension at a point where the amount of gas supplied is small, thus a hemispheric interface becomes separated from a tip of the straw to form bubbles. Specifically, fine bubbles are formed.

By making the bubble size smaller, contact efficiency of ozone with a substance to be treated is improved, and as a result, the ozone treatment efficiency is improved.

The dynamic surface tension at 30 sec is from 55 to 67 mN/m, preferably from 58 to 67 mN/m, and more preferably from 60 to 67 mN/m.

Herein, the dynamic surface tension at 30 sec is a dynamic surface tension after 30 sec from 0 msec provided that the point where the gas supply is started is 0. In general, it requires dozens of hours for the dynamic surface tension to reach the equilibrium value, and it is time consuming to perform its measurement. The dynamic surface tension at 30 sec employed in the present invention does not always equal to the equilibrium value, but considering the treatment time when the aeration treatment is performed, the dynamic surface tension at 30 sec is useful as an index to evaluate the stability of bubbles or foam.

When the dynamic surface tension at 30 sec is within the range of 55 to 67 mN/m, the formed bubbles shows an appropriate stability.

Meanwhile, when the dynamic surface tension at 30 sec is less than 55 mN/m, the bubbles become so stable that the surface of water foams during the aeration treatment thereby causing overflow or the like, thus the treatment becomes difficult. When the dynamic surface tension at 30 sec is more than 67 mN/m, the ozone treatment efficiency becomes poor. The reason is assumed to be that the stability of bubbles is low and thus the bubbles break up before contact with a substance to be treated.

The dynamic surface tension at 100 msec and the dynamic surface tension at 30 sec may be determined by measuring those of a 0.5% by mass aqueous solution (25° C.) prepared by dissolving the compound in water using a commercially available dynamic tensiometer, such as SITA t60 (trade name) manufactured by EKO INSTRUMENTS Co., Ltd., for example.

The ozone oxidation accelerator according to the present invention has a molecular weight of preferably 100 or greater, more preferably 120 or greater. If the compound has a molecular weight of 100 or greater, the dynamic surface tension at 30 sec is more likely to give a value of 67 mN/m or less, thus being preferable for the present invention. In addition, it is hardly volatile, and thus hardly causes various problems due to the volatilization.

The ozone oxidation accelerator according to the present invention has a molecular weight of preferably 250 or less, more preferably 200 or less.

If the compound has a molecular weight of 250 or less, the dynamic surface tension at 100 msec is more likely to give a value of 70 mN/m or less because of a rapid spread of molecules in an interface of bubbles. The dynamic surface tension at 30 sec is more likely to give a value of 55 mN/m or greater thereby hardly causing a foam to form, thus being preferable for the present invention.

However, although the molecular weight is 250 or less, a molecule with high hydrophobicity is likely to appear as having a large molecular weight by association. Therefore, the ozone oxidation accelerator according to the present invention is preferably a compound with low hydrophobicity. Examples of the compound with low hydrophobicity include compounds having a polar group such as a carboxy group or a hydroxyl group (e.g., carboxylic acid, alcohol, etc.), and compounds including an oxygen atom in the structure (e.g., ester, ether, etc.).

The ozone oxidation accelerator according to the present invention is not particularly limited as long as the above-mentioned dynamic surface tension conditions are satisfied, and specific examples thereof include organic acids and salts thereof (hereinafter, these are together referred to as 'organic acid (salt)'), ketone, alcohol, ether, ester, and the like.

Examples of the organic acid (salt) include carboxylic acids, sodium salts thereof, potassium salts thereof, ammonium salts thereof, and the like. The carboxylic acid (salt) has preferably 7 to 10, more preferably 7 to 9, and even more preferably 8 or 9 carbon atoms. Specific examples thereof include 2-ethylhexanoic acid, heptanoic acid, octanoic acid, nonanoic acid, salts thereof, and the like. Among these, preferred is an octanoate, particularly preferred is sodium octanoate.

Examples of the alcohol include pentanediol, 2-methyl-2, 4-pentanediol, diacetone alcohol, 3-methyl-1,3-butanediol, 2-methyl-1,3-butanediol, 3-methyl-1,4-butanediol, 2-methyl-1,4-butanediol, 2-methyl-1,2-butanediol, 3-methyl-1,2-butanediol, and the like.

Examples of the ketone include acetylacetone and the like.

Preferable examples of the ether include ether compounds of glycols (ethylene glycol, polyethylene glycol, propylene glycol, polypropylene glycol, etc.). Specific examples thereof include diethyleneglycol monoalkylether or dialkylether, such as diethyleneglycol diethylether, diethyleneglycol dimethylether, diethyleneglycol monomethylether, and diethyleneglycol monobutylether; propyleneglycol monoalkylether or dialkylether, such as propyleneglycol monoethylether and propyleneglycol monobutylether; dipropyleneglycol monoalkylether or dialkylether, such as dipropyleneglycol monoethylether, dipropyleneglycol monobutylether, dipropyleneglycol monopropylether, and dipropyleneglycol monomethylether; etc.

Examples of the ester include carboxylic acid ester, sulfuric acid ester, phosphoric acid ester, boric acid ester, and the like.

The carboxylic acid ester is a compound having at least one structure represented by 'C—CO—O—C' in the molecule.

As a carboxylic acid for the carboxylic acid ester, those exemplified for the organic acid as above can be mentioned.

In the present invention, an ester compound represented by the following general formula (I) is particularly preferable.

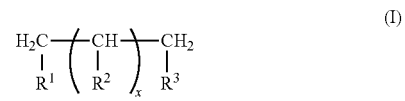

(I)

In the formula, x is 0 to 4; and $R^1$, $R^2$, and $R^3$, are each independently represents a group selected from the group consisting of —H, —OH, a group represented by the following general formula (1), and a group represented by the following general formula (2), while at least one of $R^1$, $R^2$, and $R^3$ is a group represented by the following general formula (2):

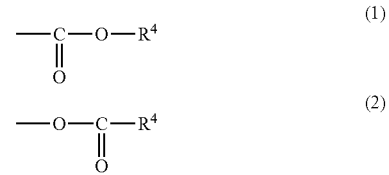

(1)

(2)

In the formulae, $R^4$ is an alkyl group having 1 to 4 carbon atom(s).

In the formula (1), x is 0 to 4, preferably 1.

$R^1$, $R^2$, and $R^3$, are each independently a group selected from the group consisting of —H, —OH, a group represented by the above general formula (1) (hereinafter, referred to as Group (1)), and a group represented by the above general formula (2) (hereinafter, referred to as Group (2)), while at least one of $R^1$, $R^2$, and $R^3$ is Group (2).

When one or two of $R^1$, $R^2$, and $R^3$ is/are a group other than Group (2), the group is particularly preferably —OH.

In the formulae (1) and (2), $R^4$ is an alkyl group having 1 to 4 carbon atom(s), and examples thereof include a methyl group, an ethyl group, an n-propyl group, an isopropyl group, an n-butyl group, a sec-butyl group, an iso-butyl group, and a tert-butyl group. $R^4$ is preferably a methyl group or an ethyl group, and particularly preferably a methyl group.

As the compound represented by the general formula (I), particularly preferred are glyceryl monoacetate (monoacetin) in which x is 1, and one of $R^1$, $R^2$, and $R^3$ is a group represented by the formula (2) in which $R^4$ is a methyl group while the other two are —OH; glycerol diacetate (diacetin) in which x is 1, and two of $R^1$, $R^2$, and $R^3$ are represented by the formula (2) in which $R^4$ is a methyl group while the other one is —OH; and glyceryl triacetate (triacetin) in which x is 1, and all of $R^1$, $R^2$, and $R^3$ are a group represented by the formula (2) in which $R^4$ is a methyl group.

There are structural isomers of monoacetin and diacetin. The structural isomer of monoacetin can be exemplified by glycerine-1-acetate, glycerine-2-acetate, or glycerine-3-acetate. The structural isomer of diacetin can be exemplified by glycerine-1,3-diacetate or glycerine-1,2-diacetate.

In addition to the above-mentioned compounds, the compound represented by the general formula (I) can be further exemplified by monobutyrin, propyl acetate, diacetoxy propane (propanediol diacetate), diacetoxy butane (butanediol diacetate), or the like.

Examples of the ester other than the compound represented by the general formula (I) include the following:

(1) esters obtained by acetylating a hydroxyl group in any of polyethylene glycol such as diethylene glycol and mono- or dialkylether thereof, and polypropylene glycol such as dipropylene glycol and mono- or dialkylether thereof, such as, for example, diethyleneglycol diacetate, diethyleneglycol monoethylether acetate, and the like;

(2) methyl, ethyl, propyl, or butylester of malic acid, citric acid, oxalic acid, malonic acid, succinic acid, maleic acid, glutaric acid, or adipic acid, such as, for example, dimethyl succinate, and the like;

(3) alkylene carbonate such as butylene carbonate, hexylene carbonate, and dibutylcarbonate, or alkyl lactone, such as, for example, pentano-4-lactone, γ-decalactone, ε-decalactone, and γ-nonalactone; and (4) 1-ethoxy-2-propanol acetate, and the like.

The ozone oxidation accelerator according to the present invention may be composed of a single kind of those compounds or a mixture of two or more kinds thereof.

As described above, since the ozone oxidation accelerator according to the present invention is a compound having a dynamic surface tension at 100 msec of 70 mN/m or less and a dynamic surface tension at 30 sec of 55 to 67 mN/m or less, the ozone oxidation can be accelerated. Accordingly, a reduction in the amount of ozone used in an ozone treatment and a high level of efficiency can be achieved.

The above realized because when the dynamic surface tension satisfies the above-mentioned conditions, fine ozone bubbles with an appropriate stability are formed while supplying ozone (aeration) into water containing the ozone oxidation accelerator.

That is, when the dynamic surface tension at 100 msec is 70 mN/m or less, fine ozone bubbles are formed. Due to the reduction in size of the bubbles, the dissolution efficiency of ozone and contact efficiency of ozone with a substance to be treated are improved.

Further, when the dynamic surface tension at 30 sec is within the range of 55 to 67 mN/m, bubble forms have an appropriate stability that it is stable until contact is made with a substance to be treated, and then break up in a relatively short period of time.

Accordingly, it is assumed that due to these synergistic effects, the contact efficiency of ozone with a substance to be treated is improved thereby accelerating the ozone oxidation, and the formation of a foam on the water surface is controlled.

Ozone Oxidation Accelerator Composition

The ozone oxidation accelerator composition according to the present invention is a composition containing the ozone oxidation accelerator according to the present invention described above.

The proportion of the ozone oxidation accelerator in the ozone oxidation accelerator composition according to the present invention is within the range of preferably 0.1 to 100% by mass, and more preferably 10 to 100% by mass, relative to the total mass of solid contents of the zone oxidation accelerator composition. If the proportion is 0.1% by mass or more, the further excellent effects of oxidation acceleration are exhibited.

The ozone oxidation accelerator composition according to the present invention may further contain other components for the purpose of providing usability, stabilization of the product, and imparting function, within the scope of not interfering with the ozone oxidation reaction. Examples of the components that may be included include various surfactants, chelating agents, flavors, enzymes, fluorescent agents, alkaline agents, viscosity improvers, dispersants, inorganic salts, alcohols, saccharides, acids, and the like.

The surfactant is not particularly limited, and can be appropriately selected from well-known surfactants depending on the purpose. Such surfactants can be exemplified by the following (1) to (4):

(1) anionic surfactants such as water-soluble salts of alkyl benzene sulfonate, alkyl sulfate, alkyl phenyl ether sulfate, polyoxyethylene alkyl ether sulfate, acylamido alkyl sulfate, alkyl phosphate, polyoxyethylene alkyl ether carboxylate, paraffin sulfonate, α-olefin sulfonate, α-sulfocarboxylate, and esters thereof, and soap;

(2) nonionic surfactants such as ethoxylated nonions e.g., polyoxyalkylether, polyoxyalkylphenyl ether, etc; sugar-based active agents e.g., polyglycerin fatty acid ester, glycerin fatty acid ester, propylene glycol fatty acid ester, sorbitan fatty acid ester, polyoxyethylene sorbitan fatty acid ester, glycoside ester, sugar ester, methyl glycoside ester, ethyl glycoside ester, alkylpolyglycoside, etc; and amide-based active agents e.g., alkyl amine oxide, alkyl diethanol amide, fatty acid N-alkyl glucamide, etc;

(3) amphoteric surfactants such as amino carboxylate e.g., alkylcarboxybetaine, alkylsulfoxybetaine, alkylamidepropylbetaine, alkylalaninate, etc; imidazoline derivatives; and alkylamineoxide; and (4) cationic surfactants such as alkyltrimethyl ammonium salt and dialkyldimethyl ammonium salt.

The surfactant may be composed of a single kind thereof or plural kinds thereof.

When ozone is aerated in water to be treated containing a high concentration of surfactant, there may be a case where an undesired phenomenon occurs upon the process such as overflow due to a foaming of the water surface. Thus, the content of a surfactant in the ozone oxidation accelerator composition is preferably determined considering the concentration of a surfactant in water to be treated. According to the present invention, the content of a surfactant is preferably from 0 to 10% by mass, more preferably from 0 to 5% by mass, relative to the total solid content of the ozone oxidation accelerator composition. If the content is 10% by mass or less, the concentration of a surfactant in water to be treated becomes a level not causing a foaming problem upon the use of the ozone oxidation accelerator composition.

The chelating agent refers to an agent that holds polyvalent metal ions when the compound is dissolved in water.

The chelating agent may be any of those capable of holding polyvalent metal ions when dissolved in water. The agent is not particularly limited, and specific examples thereof include phosphorous compounds, compounds having at least two carboxyl groups, and the like. Preferred are phosphoric acid, metaphosphoric acid, hexametaphosphoric acid, pyrophosphoric acid, tripolyphosphoric acid, 1-hydroxyethane-1,1-diphosphonic acid, triethylenetetramine-N,N,N',N',N''',N''',N'''-hexaacetate, diethylenetriamine pentaacetate, ethylenediamine tetraacetate, nitroso triacetate, oxalic acid, and citric acid; more preferred are hexametaphosphoric acid, pyrophosphoric acid, tripolyphosphoric acid, 1-hydroxyethane-1,1-diphosphonic acid, diethylenetriamine pentaacetate, ethylenediamine tetraacetate, and nitroso triacetate; and even more preferred are hexametaphosphoric acid, tripolyphosphoric acid, 1-hydroxyethane-1,1-diphosphonic acid, diethylenetriamine pentaacetate, ethylenediamine tetraacetate, and nitroso triacetate.

The chelating agent may be composed of a single kind thereof or plural kinds thereof.

The content of a chelating agent in the ozone oxidation accelerator composition is preferably 0 to 40% by mass, more preferably 0 to 10% by mass, relative to the total solid content of the ozone oxidation accelerator composition.

Ozone Oxidation Treatment Method

The ozone treatment method of the present invention is a method of treating a substance to be treated by ozone oxidation. The method is characterized by including a step of supplying ozone (aeration) into water to be treated containing a substance to be treated, in the presence of the ozone oxidation accelerator composition.

The substance to be treated is not particularly limited, and generally those subjected to an ozone treatment may be used. Specific examples of the substance to be treated include substances to be subjected to an ozone treatment for bleaching, sterilization, cleaning, deodorizing, decomposition, synthesis, or the like, such as organic substances e.g., dye, bacteria, oils and fats, amines, proteins, humus, sludge, surfactant, pesticide, etc., and products to which such an organic substance is adhered (semiconductors, foods, etc.).

The concentration of the ozone oxidation accelerator composition in water to be treated is in a level for the concentration of the ozone oxidation accelerator to be within the range of preferably 0.001 to 5% by mass, more preferably 0.01 to 1% by mass. When the concentration of the ozone oxidation accelerator is 0.001% by mass or more, the effect of the present invention is high. When the concentration is 5% by mass or less, consumption of ozone due to reaction with an ozone oxidation accelerator in water to be treated is controlled, and thereby efficiency of the ozone treatment is improved.

Ozone reacts with dissolution metals, chlorine, or organic substances due to its strong oxidation potential, and therefore water containing a less amount of such impurities (highly pure) such as ultrapure water having a resistivity of 0.00001 $M\Omega$ or greater, more preferably 0.001 $M\Omega$ or greater, even more preferably 1 $M\Omega$ or greater, is useful for the reaction, and thus is preferable as the water to be treated.

The aeration can be carried out, for example, by charging water to be treated containing the ozone oxidation accelerator composition and a substance to be treated, into a container, and then supplying a gas (aeration gas) containing at least ozone into the water to be treated. Alternatively, the ozone oxidation accelerator composition may be added in water to be treated while supplying an aeration gas into the water to be treated.

In the present process, an agitating device or the like may also be used to stir water to be treated during the aeration.

It is preferable that the container (treatment container) in which water to be treated is held and aeration is to be carried out has a surface made of materials such as a glass, TEFLON (polytetrafluoroethylene) (trademark), titanium, ozone-treated (forming a strong oxide film by ozone of high concentration) aluminum or stainless steel, on the side to be in contact with the water to be treated, because the oxidation potential of ozone is strong.

If a container made of a material such as nitrile rubber, silicon, or urethane, which are low in resistance to ozone, is used, it is necessary to pay full attention to deterioration of the treatment container.

As the aeration gas, generated ozone may be directly used, or may be diluted with a diluent gas for supply.

The generation method of ozone is not limited, and examples thereof include a method of irradiating oxygen with light of high energy such as electron rays, radioactive rays, or ultraviolet light, a chemical method, an electrolytic process, a discharge method, and the like. A silent discharge method is industrially used in many cases from the viewpoints of cost and generation amount.

A commercially available ozone generator may be used to generate ozone. For example, a low-concentration ozone generator BO-90 (trade name) manufactured by Bethel Co., Ltd., is commercially available, and a high-concentration ozone generator HO-100 (trade name) manufactured by Navi Engineering Co. Ltd., is commercially available.

Since ozone has a self-decomposition property, it is desirable to be used immediately after being prepared.

The diluent gas for a use in dilution of ozone is preferably a gas inert or poorly reactive to ozone, such as helium, argon, carbon dioxide, oxygen, air, or nitrogen.

The concentration of ozone in the aeration gas is not particularly limited, but is preferably 10% by mass or less, more preferably 1% by mass or less, in view of work safety. The lower limit is not particularly limited, but is preferably 0.000001% by mass or more, more preferably 0.0001% by mass or more, considering an ozone treatment efficiency or the like. The present invention is useful particularly when the ozone concentration is low, for example, within the range of 0.0001 to 0.5% by mass, since the oxidation of ozone can be effectively accelerated.

A method of aerating the aeration gas into water to be treated is not particularly limited, and methods conventionally adopted, such as method in which a diffusion plate, a diffusion cylinder, a diffuser, or the like, is used, can be adopted.

The treatment temperature (that is, temperature of water to be treated) during the aeration is not particularly limited, but it is preferable that the treatment temperature be 80° C. or below. If the treatment temperature is 80° C. or below, ozone hardly decomposes, and solubility of ozone in water to be treated also becomes high. The treatment temperature is more preferably 0 to 60° C., even more preferably 0 to 30° C.

pH of water to be treated during the aeration is not particularly limited. However, decomposition of ozone or decomposition of the accelerator tends to occur and thus attention is required under a high alkaline condition, for example at pH of 12 or higher, pH of water to be treated is more preferably 1 to 10, even more preferably 2 to 8.

The treatment time (time for performing aeration) during the aeration is not particularly limited, and it may be determined in view of a treatment purpose, ease of decomposition of a substance to be treated, a concentration of a substance to be treated in water to be treated, a temperature, a volume for treatment, or the like.

In the process, together with the aeration treatment, an advanced oxidation process (AOP) may also be carried out to rapidly process bleaching or decomposition of a persistent substance.

AOP is a process advancing an oxidation reaction by actively decomposing ozone to generate a hydroxyl radical which has a strong oxidation potential.

Irradiation of ultraviolet rays, adoption of high pH conditions, addition of $H_2O_2$ or inorganic catalyst, or the like is usually adopted to actively decompose ozone.

EXAMPLES

In the following, the present invention will be described in more detail with reference to Examples, but Examples are not supposed to limit characteristics of the present invention.

Test Example 1

Compounds shown in Table 1 below were measured in terms of the dynamic surface tension at 100 msec and the dynamic surface tension at 30 sec of a 0.5% by mass aqueous solution at 25° C. in accordance with the following procedure.

Compounds shown in Table 1 were each dissolved in water to prepare a 0.5% by mass aqueous solution (25° C.), and the dynamic surface tension at 100 msec and the dynamic surface tension at 30 sec of each aqueous solution were measured with SITA t60 manufactured by EKO INSTRUMENTS Co., Ltd. As water, ultrapure water having a resistivity of 18 MΩ or greater which was obtained by purification with GSR-210 manufactured by ADVANTEC was used.

The results and the molecular weight of each compound are shown in Table 1.

TABLE 1

| | Compound | Molecular Weight | Dynamic Surface Tension (100 msec) [mN/m] | Dynamic Surface Tension (30 sec) [mN/m] |
|---|---|---|---|---|
| Example 1 | Monoacetin | 134.1 | 69.8 | 66.6 |
| Example 2 | Diacetin | 176.2 | 66.8 | 61.9 |
| Example 3 | Triacetin | 218.2 | 61.7 | 61.5 |
| Example 4 | 1,2-propyleneglycol diacetate | 160.2 | 60.6 | 60.0 |
| Example 5 | monobutylin | 162.2 | 64.0 | 62.2 |
| Example 6 | 1-ethoxy-2-propanol acetate | 146.2 | 57.2 | 55.0 |
| Example 7 | n-propyl acetate | 102.1 | 55.6 | 55.5 |
| Example 8 | 1,4-butanediol diacetate | 174.2 | 59.1 | 57.8 |
| Example 9 | sodium octanoate | 166.2 | 67.7 | 66.4 |
| Comparative Example 1 | Sodium lauryl sulfate* | 288.4 | 38.9 | 36.2 |
| Comparative Example 2 | C12EO15* | 847.1 | 40.9 | 37.2 |
| Comparative Example 3 | C12EO40* | 1948.5 | 45.0 | 40.8 |
| Comparative Example 4 | Sucrose stearate ester* | 608.8 | 70.9 | 51.8 |
| Comparative Example 5 | Sucrose laurate ester* | 524.6 | 40.8 | 35.2 |
| Comparative Example 6 | Glycerin monocaprate* | 218.3 | 26.4 | 22.5 |
| Comparative Example 7 | Glycerin monocaprylate* | 246.4 | 29.2 | 22.2 |
| Comparative Example 8 | Decaglycerin monolaurate* | 941.1 | 67.1 | 39.0 |
| Comparative Example 9 | Sodium acetate | 82.0 | 72.0 | 72.0 |
| Comparative Example 10 | Sodium hexanoate | 138.0 | 69.1 | 68.5 |
| Comparative Example 11 | Ethanol | 46.1 | 69.4 | 69.0 |
| Comparative Example 12 | Glycerin | 92.1 | 72.3 | 72.1 |
| Comparative Example 13 | Propylene glycol | 76.1 | 70.2 | 70.0 |
| Comparative Example 14 | Triethylene glycol | 150.2 | 70.5 | 70.1 |
| Comparative Example 15 | Propylene carbonate | 102.1 | 69.7 | 68.9 |

In Table 1, compounds with * represent commercially available surfactants, and the following products were used, respectively.
Sodium lauryl sulfate: for biological chemistry (manufactured by Wako Pure Chemical Industries, Ltd.)
C12EO15: POE (15) lauryl ether (lauryl ether of polyoxyethylene (average addition mole number of 15)) (synthesis product: a product obtained by a method described in Japanese Unexamined Patent Application, First Publication No. H1-164437, Japanese Laid-Open Patent Application, No. 2000-61304, etc., which has a narrow rate of 55% or more, the narrow rate being defined in Japanese Laid-Open Patent Application, No. 2001-164298.)
C12EO40: POE (40) lauryl ether (lauryl ether of polyoxyethylene (average addition mole number of 40)) (synthesis product: a product obtained by a method described in Japanese Unexamined Patent Application, First Publication No. H1-164437, Japanese Laid-Open Patent Application, No. 2000-61304, etc., which has a narrow rate of 30% or more, the narrow rate being defined in Japanese Laid-Open Patent Application, No. 2001-164298.)
Sodium sucrose stearate: S-1670 (manufactured by Mitsubishi-Kagaku Foods Corporation.)
Sodium sucrose laurate: L-1695 (manufactured by Mitsubishi-Kagaku Foods Corporation.)
Glycerin monocaprate: manufactured by Riken Vitamin Co., Ltd.
Glycerin monocaprylate: manufactured by Riken Vitamin Co., Ltd.
Decaglycerin monolaurate: Decaglyn1-L (manufactured by Nikko Chemicals Co., Ltd.)

Next, the following tests were carried out using the compounds shown in Table 1. The results are shown in Table 2.
<Foaming Test>
200 mL of a 0.5% by mass aqueous solution prepared in the above manner was put in a 300 mL tall beaker, and an air having an ozone concentration of 5 g/Nm$^3$ was aerated through a dispersion tube at a gas flow rate of 1.0 L/min at 25° C. for 10 minutes. As the dispersion tube, KINOSHITA-type fritted-glass filter 503G No. 1 (coarse) manufactured by KINOSHITARIKA was used.

After the aeration, a case where foam overflows from the tall beaker is shown as x and a case where foam does not overflow is shown as O.

At this time, height (cm) of the foam was also measured.
<Bleaching Test 1>
A sample solution was prepared by adding dye to be bleached to 200 mL of a 0.5% by mass aqueous solution prepared in the above manner so that the dye concentration is 0.5 mmol/L. As the dye to be bleached, Acid Black 48 (molecular weight Mw of 459.46) manufactured by ACROS was used.

200 mL of each sample solution was put in a 300 mL tall beaker, and an air having an ozone concentration of 5 g/Nm$^3$ was aerated through a dispersion tube at a gas flow rate of 1.0 L/min at 25° C. for 1 hour. As the dispersion tube, KINOSHITA-type fritted-glass filter 503G No. 1 (coarse) manufactured by KINOSHITARIKA was used.

After the reaction was ended, an absorbance at 600 nm of each sample solution was measured using an ultraviolet visible absorptiometer, and a dye decomposition rate was calculated with the following formula.

Dye Decomposition Rate (%)=(initial absorbance−absorbance after the reaction)/initial absorbance× 100

Those giving a dye decomposition rate of 70% or more are suited for an ozone oxidation accelerator.

A solution free from compounds other than the dye to be bleached was used as a control sample to perform a bleaching test with ozone alone in the same manner. The dye decomposition rate thus obtained was 61%.

TABLE 2

| | | Foaming Test | | Bleaching Test |
|---|---|---|---|---|
| | Compound | Overflow | Height of foam after 10 minutes (cm) | Dye decomposition rate (%) |
| Example 1 | Monoacetin | o | 0.5 | 74 |
| Example 2 | Diacetin | o | 0.6 | 80 |
| Example 3 | Triacetin | o | 1.5 | 89 |
| Example 4 | 1,2-propyleneglycol diacetate | o | 1.4 | 90 |
| Example 5 | monobutylin | o | 1.3 | 78 |
| Example 6 | 1-ethoxy-2-propanol acetate | o | 1.5 | 85 |
| Example 7 | n-propyl acetate | o | 1.5 | 85 |
| Example 8 | 1,4-butanediol diacetate | o | 1.5 | 93 |
| Example 9 | Sodium octanoate | o | 1.3 | 74 |
| Comparative Example 1 | Sodium lauryl sulfate* | x | >6.5 | Unmeasurable |
| Comparative Example 2 | C12EO15* | x | >6.5 | Unmeasurable |

TABLE 2-continued

| | | Foaming Test | | Bleaching Test |
|---|---|---|---|---|
| | Compound | Overflow | Height of foam after 10 minutes (cm) | Dye decomposition rate (%) |
| Comparative Example 3 | C12EO40* | x | >6.5 | Unmeasurable |
| Comparative Example 4 | Sucrose stearate ester* | x | >6.5 | Unmeasurable |
| Comparative Example 5 | Sucrose laurate ester* | x | >6.5 | Unmeasurable |
| Comparative Example 6 | Glycerin monocaprate* | x | >6.5 | Unmeasurable |
| Comparative Example 7 | Glycerin monocaprylate* | x | >6.5 | Unmeasurable |
| Comparative Example 8 | Decaglycerin monolaurate* | x | >6.5 | Unmeasurable |
| Comparative Example 9 | Sodium acetate | ○ | 0.4 | 50 |
| Comparative Example 10 | Sodium hexanoate | ○ | 0.4 | 62 |
| Comparative Example 11 | Ethanol | ○ | 0.4 | 65 |
| Comparative Example 12 | Glycerin | ○ | 0.4 | 48 |
| Comparative Example 13 | Propylene glycol | ○ | 0.4 | 48 |
| Comparative Example 14 | Triethylene glycol | ○ | 0.4 | 45 |
| Comparative Example 15 | Propylene carbonate | ○ | 0.4 | 60 |

From the results in Tables 1 and 2, it was confirmed that when the compounds (Examples 1 to 9) having the dynamic surface tension at 100 msec of 70 mN/m or less and the dynamic surface tension at 30 sec of from 55 to 67 mN/m were used, overflow during the aeration was prevented and excellent bleaching effects were achieved, and that these compounds accelerated the ozone oxidation.

On the other hand, when the compounds (Comparative Examples 1 to 8) having the dynamic surface tension at 30 sec of less than 55 mN/m were used, overflow of foam was caused. In the examples in which such compounds were employing, the treatment was not sufficiently carried out due to the overflow, and the dye decomposition rate could not be measured.

In addition, when the compounds (Comparative Examples 9 to 15) having the dynamic surface tension at 100 msec of more than 70 mN/m or the dynamic surface tension at 30 sec of more than 67 mN/m were used, low dye decomposition rates were obtained.

<Bleaching Test 2>

As the test solutions, Test Solution a composed of ultrapure water having a resistivity of 18 MΩ or greater, prepared by purification with GSR-210 manufactured by ADVANTEC, and Test Solution b prepared by dissolving triacetin in the ultrapure water in a concentration of 0.5% by mass, were prepared. To each of Test Solutions a and b, Acid Black 48 dye (0.5 mmol/L) was added as a dye to be bleached, and Bleaching Test 2 was performed. Bleaching Test 2 was carried out in the same manner as in Bleaching Test 1, except that 400 mL of each test solution was put in a 1,000 mL Teflon (trade name) pot, OZSD-3000A (manufactured by Ebara Jitsugyo Co., Ltd.) was used as an ozone generator, and an air having an ozone gas concentration 10 times the concentration before (50 g/Nm$^3$) was supplied to each solution through a dispersion tube at a flow rate of 1.0 L/min at 25° C. for 3 minutes. Since an ozone gas of high concentration is used in the present test, waste ozone gas was passed through an ozone decomposer to make it harmless.

TABLE 3

| | Dye Decomposition Rate |
|---|---|
| Test Solution a | 85% |
| Test Solution b | 99% |

It was revealed from the results shown in Table 3 that the dye decomposition acceleration effect was still be obtained by the presence of triacetin even if an ozone gas of high concentration was used.

Test Example 2

Preparation of General Bacterial Solution 20 g of a commercially available non-bleached sprout was put in a homogenizer bag with a filter, and 90 mL of phosphate buffered saline was added thereto. The mixture was subjected to disruption for 60 seconds with a homogenizer (SH-IIM manufactured by ELMEX), and the thus obtained disrupted solution was filtered through a filter provided to the homogenizer bag manufactured by Atect Corporation. The filtered disrupted solution was used as a general bacterial solution.

<Sterilization by Aeration>

As the test solutions, Test Solution a composed of ultrapure water having a resistivity of 18 MΩ or greater, prepared by purification with GSR-210 manufactured by ADVANTEC, Test Solution b prepared by dissolving triacetin in the ultrapure water in a concentration of 0.5% by mass, and Test Solution c prepared by dissolving glycerin in the ultrapure water in a concentration of 0.5% by mass, were prepared.

6 mL of the above-mentioned general bacterial solution was added to 594 mL of each of Test Solutions a to c to prepare a total of 600 mL of Sample A (Test Solution a+bacterial solution), Sample B (Test Solution a+bacterial solution), Sample C (Test Solution b+bacterial solution), and Sample D (Test Solution c+bacterial solution). The thus prepared samples were used in the experiment.

In the experiment, Sample A was put in a treatment container (1,000 mL beaker of PYREX (trademark) glass), ozone gas was generated with the high-concentration ozone generator described below, and the ozone aeration was carried out at 25° C. using a dispersion tube while performing stirring with a TEFLON (trademark) stirrer at a rotary rate of 200 rpm by varying the aeration time (1 min, 5 mins, 10 mins). As the dispersion tube, KINOSHITA-type fritted glass filter 503G No. 1 (coarse) manufactured by KINOSHITARIKA was used.

Samples B to D were subjected to the ozone aeration in the same manner as above, except that a low-concentration ozone generator described below was used instead of the high-concentration ozone generator.

High-concentration ozone generator: HO-100 manufactured by Navi Engineering Co., Ltd. (flow rate: 1.0 L/min, ozone concentration: 5 g/m$^3$)

Low-concentration ozone generator: BO-90 manufactured by Bethel Co., Ltd. (flow rate: 2.1 L/min, ozone concentration: 0.7 g/m$^3$)<

<Measurement of Bacterial Count>

Each of the above-mentioned Samples A to D was collected in a test tube sterilized in advance immediately after the aeration, and diluted in steps of 10 fold in test tubes using a peptone saline buffer solution. For the dilution, a peptone saline buffer solution was used. 100 μL of each diluent was taken with a micropipette and dropped onto a normal agar medium in Petri Dishes. After spreading onto the medium with each disposable streak bar, the plates were incubated at 37° C. for 24 hours for culturing, and then the number of colonies on each Petri Dish having at most 300 colonies was counted to determine the surviving viable cell count (bacterial count). Two Petri Dishes were made per each stepwise dilution for culturing, and determined bacterial counts were averaged.

The normal agar medium, the peptone saline buffer solution, and the phosphate buffered saline available from Atect Corporation were used.

A graph showing results of Samples A to D was drawn with the aeration time on a transverse axis against the bacterial count on the vertical axis. The graph is shown in FIG. 1. As is apparent from the graph shown in FIG. 1, when no additive (neither triacetin nor glycerin) was formulated, the bacterial count was decreased with the aeration time in high-concentration ozone aeration (Sample A), but in low-concentration ozone aeration (Sample B), almost no change in the bacterial count was observed for the first 5 minutes of the aeration time and a slight decrease of about 1/20 was shown at the aeration time of 10 minutes. The result reveals that the rate of sterilization is slower in low-concentration ozone aeration than in high-concentration ozone aeration.

In contrast, although Sample C containing 0.5% by mass of triacetin was subjected to low-concentration ozone aeration in the same manner as that of Sample B, the bacterial count was decreased at the same sterilization rate as in Sample A subjected to high-concentration ozone aeration, thus clearly confirming that the sterilization effect is improved.

In contrast, Sample D containing 0.5% by mass of glycerin exhibited a slow sterilization rate and almost no change in bacterial count at 5 minutes aeration in the same manner as in Sample B.

Figure 2:
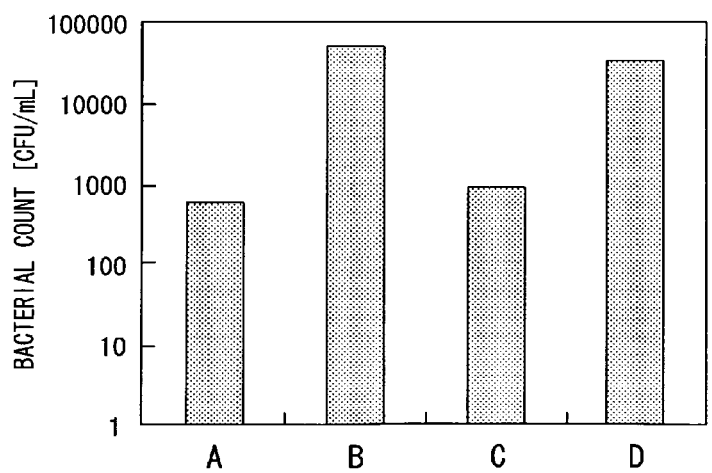
FIG. 2 is a graph showing a sterilization effect in cases where ozone aeration is performed by changing an ozone concentration without adding any additives and cases where glycerin or triacetin is added in low-concentration ozone aeration in Test Example 2.

In FIG. 2, bacterial counts after 5 minutes aeration time for each of Samples A to D were shown. As is apparent from the comparison of high-concentration ozone aeration (Sample A) with low-concentration ozone aeration (Sample B) under a no additive added condition in FIG. 2, the bacterial count was decreased by about 1/100 after 5 minutes of high-concentration ozone aeration as also shown in the graph of FIG. 1 while the bacterial count showed almost no change after 5 minutes low-concentration ozone aeration.

In contrast, although Sample C containing 0.5% by mass of triacetin was subjected to low-concentration ozone aeration, the bacterial count was decreased by the same level with 5 minutes aeration as in Sample A of high-concentration ozone aeration, thus clearly confirming that the sterilization effect is improved.

In contrast, Sample D containing 0.5% by mass of glycerin showed almost no change in the bacterial count with 5 minutes aeration, in the same manner as that of Sample B.

Test Example 3

Deodorizing Effect on Saprolegnia Smell

Geosmin (reagent for research of natural products chemistry, manufactured by Kanto Chemical Co., Inc.) which is a mold-smelling substance of tap water was dispersed in ethanol (Guaranteed Reagent, manufactured by Kanto Chemical Co., Inc.) to 100 ppm to prepare a solution.

A new 50 mL of beaker was immersed in 1 mol/L hydrochloric acid, then rinsed with ion-exchange water, and further immersed in methanol (Guaranteed Reagent, manufactured by Kanto Chemical Co., Inc.), to remove dirt or smell from the beaker surface. In addition, the beaker was well-rinsed with ion-exchange water, and then dried.

1 mL of the geosmin solution was put in the beaker, and the solvent was volatized while applying on an inner wall of the beaker for a use in the following test.

40 mL of water at 80° C. was added to the beaker, and 1.5 g/Nm$^3$ of ozone gas was aerated for 10 minutes at a flow rate of 1 L/min using KINOSHITA-type fritted-glass filter 501G No. 4 (fine) gas dispersion tube. Then, water was removed. A sample was obtained by drying directly at a room temperature for 24 hours, and its smell was evaluated (Test Example 3-1).

A sample was prepared in the same manner as in Test Example 3-1, except that 1,000 ppm aqueous triacetin solution was used instead of water, and its smell was evaluated (Test Example 3-2).

A sample was prepared in the same manner as in Test Example 3-1, except that air was aerated instead of the ozone gas in the aeration process, and its smell was evaluated (Test Example 3-3).

A sample was prepared in the same manner as in Test Example 3-2, except that air was aerated instead of the ozone gas in the aeration process, and its smell was evaluated (Test Example 3-4).

The evaluation on smell was sensuously performed by three examiners in accordance with the following five-graded criteria, and the average value thereof was calculated.

5 points: can sense extremely strong geosmin smell
4 points: can sense quite strong geosmin smell
3 points: can sense geosmin smell
2 points: can sense slight geosmin smell
1 point: cannot sense geosmin smell (almost the same as the non-geosmin treated beaker)

TABLE 4

|  | Average Value |
| --- | --- |
| Test Example 3-1 | 2.3 points |
| Test Example 3-2 | 1.3 points |
| Test Example 3-3 | 5 points |
| Test Example 3-4 | 4.7 points |

The results shown in Table 4 revel that a more effective deodorizing effect can be achieved by performing the aeration using ozone gas in the presence of triacetin than in the case of performing the aeration using ozone alone.

INDUSTRIAL APPLICABILITY

The ozone oxidation accelerator, the ozone oxidation accelerator composition, and the ozone treatment method, according to the present invention, enable bubbling on the water surface to be controlled and ozone oxidation to be simply accelerated, in an ozone aeration treatment, and particularly in a low concentration ozone aeration treatment. Therefore, a reduction in the amount of ozone used in an ozone aeration treatment and a high level of efficiency can be achieved according to the present invention.

The invention claimed is:

1. An ozone treatment method for treating a substance to be treated by ozone oxidation, the method comprising:
supplying ozone into water to be treated that comprises a substance to be treated, in the presence of an ozone oxidation accelerator, wherein
the ozone oxidation accelerator comprises a compound, wherein a 0.5% by mass aqueous solution containing the compound at 25° C. has a dynamic surface tension at 100 msec of 70 mN/m or less and a dynamic surface tension at 30 sec of 55 to 67 mN/m, and
a concentration of the ozone oxidation accelerator in the water to be treated is within the range of 0.001 to 5% by mass, wherein
the compound is selected from the group consisting of monoacetin, diacetin, and triacetin.

2. The ozone treatment method according to claim 1, wherein ozone is supplied by bubbling.

3. The ozone treatment method according to claim 1, wherein the ozone oxidation accelerator is triacetin.

* * * * *